(12) United States Patent
Katsuda et al.

(10) Patent No.: US 8,953,092 B2
(45) Date of Patent: Feb. 10, 2015

(54) OPTICAL FUNCTION DEVICE AND IMAGE-CAPTURING DEVICE

(75) Inventors: Yasutoshi Katsuda, Kanagawa (JP); Nobuyuki Kodama, Tokyo (JP); Shinichi Hasegawa, Chiba (JP); Yasuo Maeda, Osaka (JP); Kazuhiko Kojima, Osaka (JP); Hiroshi Katsuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 51 days.

(21) Appl. No.: 13/814,701

(22) PCT Filed: Jul. 12, 2011

(86) PCT No.: PCT/JP2011/066286
§ 371 (c)(1),
(2), (4) Date: Feb. 6, 2013

(87) PCT Pub. No.: WO2012/023372
PCT Pub. Date: Feb. 23, 2012

(65) Prior Publication Data
US 2013/0135519 A1 May 30, 2013

(30) Foreign Application Priority Data
Aug. 18, 2010 (JP) ................................. 2010-183134

(51) Int. Cl.
*H04N 5/232* (2006.01)
*G02B 1/11* (2006.01)
(Continued)

(52) U.S. Cl.
CPC .............. *H04N 5/23212* (2013.01); *G02B 1/11* (2013.01); *G03B 13/36* (2013.01); *G03B 19/12* (2013.01); *H04N 5/2254* (2013.01); *G02B 1/118* (2013.01); *G02B 27/144* (2013.01)
USPC ......................................... 348/350; 348/340

(58) Field of Classification Search
CPC ......................... H04N 5/2356; H04N 5/23212
USPC .................................. 348/345, 349, 350, 340
See application file for complete search history.

(56) References Cited

U.S. PATENT DOCUMENTS

2008/0316353 A1* 12/2008 Suda .............................. 348/349
2008/0316602 A1* 12/2008 Kameshima et al. .......... 359/599
(Continued)

FOREIGN PATENT DOCUMENTS

| JP | 02-089039 | 3/1990 |
|---|---|---|
| JP | 08-179202 | 7/1996 |

(Continued)

OTHER PUBLICATIONS

International Search Report; International Application No. PCT/JP2011/066286; International Filing Date: Jul. 12, 2011; Completion of the International Search Report: Nov. 7, 2011. (PCT/ISA/210).

*Primary Examiner* — Sinh Tran
*Assistant Examiner* — Zhenzhen Wu
(74) *Attorney, Agent, or Firm* — Rader, Fishman & Grauer PLLC

(57) ABSTRACT

An optical function device includes a base material layer, a semi-transparent layer formed on a principal plane of the base material layer, the semi-transparent layer reflecting light of incident light at a ratio determined in advance and passing remaining light; and a reflection prevention layer formed on a principal plane opposite to the principal plane of the base material layer with respect to the base material layer, the reflection prevention layer preventing reflection of the light passing through the base material layer. The image-capturing device includes an optical function device, a first light receiving device for receiving transmission light from the optical function device, and a second light receiving device for receiving reflection light from the optical function device.

14 Claims, 10 Drawing Sheets

(51) Int. Cl.
*G03B 13/36* (2006.01)
*G03B 19/12* (2006.01)
*H04N 5/225* (2006.01)
*G02B 27/14* (2006.01)

(56) References Cited

U.S. PATENT DOCUMENTS

2010/0150539 A1* 6/2010 Kusaka ............ 396/125
2011/0025966 A1* 2/2011 Sakai ............... 349/119

FOREIGN PATENT DOCUMENTS

| | | |
|---|---|---|
| JP | 08-254751 | 10/1996 |
| JP | 2003-344010 | 12/2003 |
| JP | 2005-037490 | 2/2005 |
| JP | 2006-197406 | 7/2006 |
| JP | 2008-014998 | 1/2008 |
| JP | 2008-288299 | 11/2008 |
| WO | WO-2005/096025 | 10/2005 |

* cited by examiner

A

B

A

B

A

B

A

B

C

D

E

OPTICAL FUNCTION DEVICE AND IMAGE-CAPTURING DEVICE

TECHNICAL FIELD

The disclosure of the present application relates to an optical function device and an image-capturing device. More particularly, the disclosure of the present application relates to an optical function device and an image-capturing device including the optical function device in which multiple reflection is suppressed.

BACKGROUND ART

A single-lens reflex camera is known, in which a single lens is used as both an image-capturing lens and a finder lens so that incident light from the image-capturing lens is reflected by a mirror to allow it to be seen in a finder. The single-lens reflex camera allows a photographer to change the lens so as to take photos in accordance with the scenes where photos are taken and in accordance with the needs of the photographer. The light incident upon the finder's optical system is obtained by reflecting the light incident from the lens using the mirror, and when a photo is taken, the mirror is retracted, and the light incident from the lens reaches the film as it is. Accordingly, when the single-lens reflex camera is used, there is an advantage in that it is possible to take a picture of a subject which is seen in the finder exactly as the shown image without any parallax.

In order to provide a single-lens reflex camera with an autofocus sensor, a single-lens reflex camera is known, in which a mirror is made of a semi-transparent mirror, and transmission light is passed to an autofocus sensor using a still another sub-mirror (for example, see Patent Documents 1 and 2). In such single-lens reflex cameras, autofocus (hereinafter, autofocus is referred to as AF as necessary) is performed until the shutter is triggered.

As described above, the single-lens reflex camera changes the position of the movable mirror, thereby switching which of the finder's optical system and the film the incident light is passed to. This means that, at the instance at which a subject is photographed (exposed), it is impossible to see the subject through the finder. When the semi-transparent mirror and the sub-mirror is provided in the configuration, it is necessary to retract both of the semi-transparent mirror and the sub-mirror to a retraction position, and this makes it difficult to cause the AF to function normally when continuous shooting is performed.

Accordingly, a configuration to abolish the sub-mirror and make the semi-transparent mirror as a fixed-type has been suggested (for example, see Patent Document 3). In the configuration as disclosed in Patent Document 3, reflection light from the semi-transparent mirror is passed on to the AF sensor unit, and transmission light therefrom is passed on to the image-capturing device. According to the configuration as disclosed in Patent Document 3, a subject can be seen at all times even during exposure, and the AF can be performed at all times.

However, when the semi-transparent mirror is made as the fixed-type, multiple reflection occurs within the semi-transparent mirror, and an image that does not actually exist (hereinafter referred to as a ghost as necessary) may appear. This kind of phenomenon also occurs when an infrared (IR) cut filter and an ultraviolet (UV) cut filter are provided on one surface of the semi-transparent mirror. In particular, in a digital camera, it is easy to enlarge a taken digital image, and the ghost is likely to cause problems.

CITATION LIST

Patent Documents

Patent Document 1: Specification of Patent No. 2801217
Patent Document 2: Japanese Patent Application Laid-Open No. H8-254751
Patent Document 3: Japanese Patent Application Laid-Open No. 2006-197406

SUMMARY OF THE INVENTION

Problems to be Solved by the Invention

It is an object to provide an optical function device and an image-capturing device including the optical function device in which multiple reflection is suppressed.

Solutions to Problems

A preferred embodiment of an optical function device is as follows.

An optical function device includes a base material layer, a semi-transparent layer formed on a principal plane of the base material layer, the semi-transparent layer reflecting light of incident light at a ratio determined in advance and passing remaining light; and a reflection prevention layer formed on a principal plane opposite to the principal plane of the base material layer with respect to the base material layer, the reflection prevention layer preventing reflection of the light passing through the base material layer.

A preferred embodiment of an image-capturing device is as follows.

An image-capturing device includes an optical function device including a base material layer, a semi-transparent layer formed on a principal plane of the base material layer, the semi-transparent layer reflecting light of incident light at a ratio determined in advance and passing remaining light, and a reflection prevention layer formed on a principal plane opposite to the principal plane of the base material layer with respect to the base material layer, the reflection prevention layer preventing reflection of the light passing through the base material layer, the image-capturing device further includes a first light receiving device for receiving transmission light from the optical function device and a second light receiving device for receiving reflection light from the optical function device.

The optical function device has a semi-transparent layer formed on a principal plane of the base material layer, and a reflection prevention layer formed on a principal plane opposite to the surface formed with the semi-transparent layer. The light propagating through the inside of the base material layer to the reflection prevention layer is prevented from being reflected to the inside of the base material layer by the reflection prevention layer. Therefore, multiple reflections within the optical function device are suppressed.

Effects of the Invention

According to at least one example, multiple reflections within the optical function device can be suppressed, and therefore, an image-capturing device that suppresses the appearance of a ghost can be provided.

MODE FOR CARRYING OUT THE INVENTION

Figure 1:
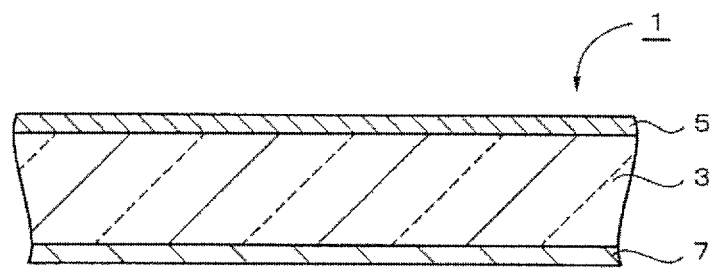
FIG. 1 is a schematic cross sectional view illustrating an optical function device according to a first embodiment.

Hereinafter, embodiments of an optical function device and an image-capturing device will be explained. It should be noted that the explanation will be made in the following order.
<0. Semi-transparent Mirror-fixed-type Image-capturing device>
(Schematic configuration)
(Multiple reflections within semi-transparent Mirror)<
<1. First Embodiment>
[Optical function device]
(Base material layer)
(Semi-transparent layer)
(Reflection prevention layer)
(Reduction of warping)
<2. Second Embodiment>
[Image-capturing device]
(Configuration of Image-capturing device)
(Arrangement of optical function device)
[Example]
<3. Modification>

It should be noted that embodiments described below are preferred specific examples of an optical function device and an image-capturing device. In the explanation below, various kinds of limitations which are preferred in terms of techniques are added, but unless it is specifically indicated that the disclosure of the present application is particularly limited, examples of optical function devices and image-capturing devices are not limited to the embodiments described below.

0. Semi-transparent Mirror-fixed-type Image-capturing device

In order to facilitate understanding of the embodiments, first, a schematic configuration of a semi-transparent mirror-fixed-type image-capturing device will be explained.
(Schematic Configuration)

FIG. 10A is a schematic cross sectional view illustrating a schematic configuration of a semi-transparent mirror-fixed-type image-capturing device.

FIG. 10B is a schematic line diagram enlarging and illustrating a portion close to the semi-transparent mirror. As illustrated in FIG. 10A, a replaceable image-capturing optical system 123 is attached to a housing 121 constituting a main body of an image-capturing device 111. An image-capturing lens 125, a diaphragm, and the like are arranged in a lens barrel 127, which constitute the image-capturing optical system 123. The image-capturing lens 125 of the image-capturing optical system 123 is driven by a focus driving system (not shown), which enables AF operation.

In the housing 121, the semi-transparent mirror 101 is fixed so that it can be inclined with respect to the optical axis of subject light. Above the semi-transparent mirror 101, an AF module 133 is provided. The method of the AF is usually a phase difference detection method. A film 135 is provided at the side opposite to the image-capturing lens 125 with respect to the semi-transparent mirror 101. In FIG. 10A, the shutter mechanism is not shown.

Figure 10:
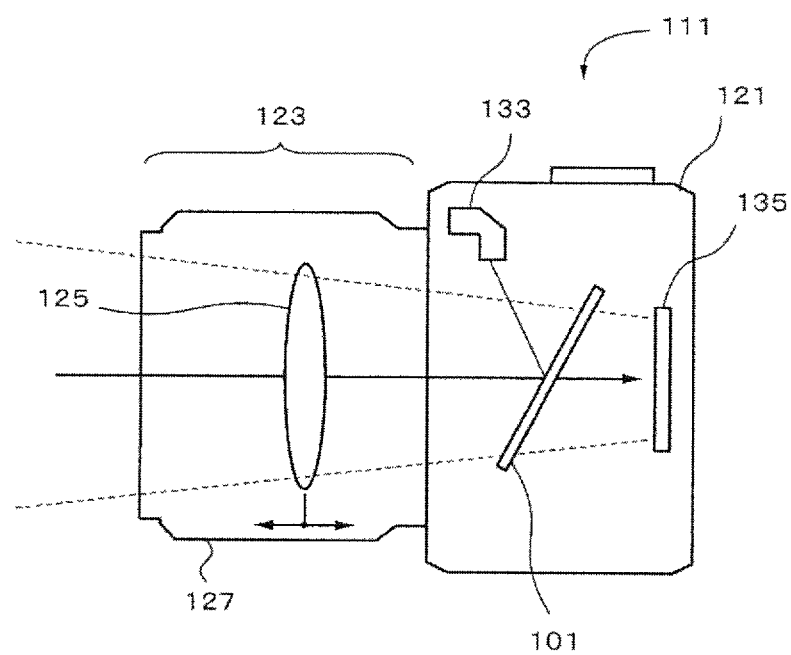
FIG. 10A is a schematic cross sectional view illustrating a schematic configuration of a semi-transparent mirror-fixed-type image-capturing device.
FIG. 10B is a schematic line diagram enlarging and illustrating a portion close to the semi-transparent mirror.
Figure 10:
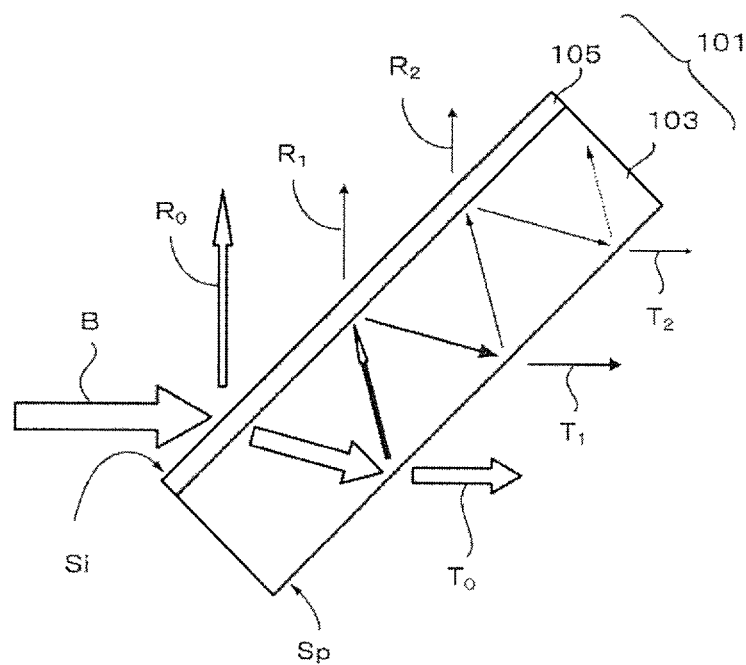

The semi-transparent mirror 101 reflects and transmits the subject light incident into the housing 121 via the image-capturing lens 125. As illustrated in FIG. 10B, the semi-transparent mirror 101 uses a resin film 103 having optical transparency as a base material, and an optical thin film 105 is formed on one principal plane thereof. The optical thin film 105 is formed on the principal plane closer to the image-capturing lens 125, and is provided to reflect, with a predetermined reflectance, the light incident upon the semi-transparent mirror 101. The light reflected by the semi-transparent mirror 101 is passed on to the AF module 133, and the remaining light (transmission light) is passed on to the film or the image-capturing device. More specifically, the image-capturing device having the configuration of FIG. 10 uses a portion of the subject light for the AF, and performs exposure of the film or the image-capturing device with the remaining light. The image-capturing device as illustrated in FIG. 10 is an example where the transmission light reaches the film 135.

In the configuration as illustrated in FIG. 10, the semi-transparent mirror 101 is made as the fixed-type, and the retraction operation is not performed, and therefore, a portion of the subject light is incident upon the AF module at all times. Therefore, the AF is performed at all times. In the configuration as illustrated in FIG. 10, no optical view finder is provided, and the light reflected upward by the semi-transparent mirror 101 is passed on to the AF module 133 for the AF. However, the optical system may be devised to provide both of the optical view finder and the AF module 133 at the upper portion.
(Multiple Reflections within Semi-Transparent Mirror)

As illustrated in FIG. 10B, the light transmitting through the semi-transparent mirror 101 includes light that is reflected within the semi-transparent mirror 101 multiple times and is thereafter output to the film or the image-capturing device.

In the semi-transparent mirror 101 of FIG. 10B, a surface closer to the image-capturing lens is denoted as Si, and the surface opposite thereto is denoted as Sp. In contrast to the subject light B incident upon the surface Si, lights that transmit through the semi-transparent mirror 101 and go out from the surface Sp to the outside are denoted as $T_n$ (n=0, 1, 2, ...). A portion of the subject light B incident upon the semi-transparent mirror 101 is reflected by the surface Si with a predetermined ratio, and is made into reflection light $R_0$ to the AF module. The remaining light advances inside of the semi-transparent mirror 101, but a portion thereof is reflected by the surface Sp, and returns back to the inside of the semi-transparent mirror 101. The light that is not reflected by the surface Sp is emitted to the outside as $T_0$.

The light that returned to the inside of the semi-transparent mirror 101 is reflected by the surface Si, and a portion thereof is reflected by the surface Sp again to return back to the inside of the semi-transparent mirror 101, and the remaining light is emitted to the outside as $T_1$. Thereafter, lights that are repeatedly reflected and emitted to the outside are denoted as $T_2$, $T_3$, ..., which are arranged in the descending order of the number of reflections, and $T_n$ where n is equal to or more than one is denoted as high-order unwanted light.

When the film or the image-capturing device is exposed by high-order unwanted light, the high-order unwanted light is recorded as ghost. For example, an object emitting light such as a fluorescent light is captured as an image, a mist-like blurred image appears as a ghost around the image of the fluorescent light. The ghost is generated in a certain direction with respect to the image of the fluorescent light. When an illuminating LED (Light-Emitting Diode) and the like are captured as an image, multiple bright spots arranged in a row appear close to a portion where the LED emits light. Multiple bright spots become inconspicuous as they grow away from the light emitting portion of the LED. This is considered to be because, when n increases, the intensity of the unwanted light decreases.

The appearance of the ghost as described above does not cause serious problems in a photograph developed from a film, but causes problems in a case where the semi-transparent mirror-fixed-type image-capturing device is a digital camera using a CCD (Charge Coupled Device), CMOS (Complementary Metal Oxide Semiconductor) and the like as an image sensor. This is because the digital image can be easily enlarged using a personal computer and the like.

In the semi-transparent mirror-fixed-type image-capturing device, a portion of the subject light is reflected and used for the AF, and the remaining light is used for exposure. For this reason, such high-order unwanted light is preferably reduced as much as possible, and it is preferred that the amount of light used for image-capturing be made sufficient.

As illustrated in FIG. 10B, a portion of the light reflected by the surface Sp and returned to the inside of the semi-transparent mirror 101 becomes light $R_m$ (m=1, 2, ...) that is not reflected by the surface Si but is emitted to the outside. In the configuration in which an AF module for phase difference AF is arranged above the semi-transparent mirror 101, the light $R_m$ is taken as noise light, which causes an error in a distance measuring value. Therefore, it is impossible to obtain a focused image.

Ghost and displacement of a distance measuring value may occur even when an IR cut filter and a UV cut filter are provided on a surface of the semi-transparent mirror 101, and therefore, the semi-transparent mirror used for the semi-transparent mirror-fixed-type image-capturing device is preferably configured to suppress multiple reflection occurring therein.

<1. First Embodiment>

Subsequently, the first embodiment will be explained. The first embodiment relates to an optical function device preferably used as a semi-transparent mirror for a semi-transparent mirror-fixed-type image-capturing device.

[Optical Function Device]

The optical function device includes a base material layer, a semi-transparent layer formed on a principal plane of the base material layer, and a reflection prevention layer formed on a principal plane opposite to the surface formed with the semi-transparent layer.

The semi-transparent layer reflects incident light with a ratio defined in advance, and transmits the remaining light. The reflection prevention layer prevents the light advancing in the base material layer from being reflected by an interface between the base material layer and the reflection prevention layer and from being returned back to the inside of the base material layer.

Therefore, this can suppress multiple reflection in the optical function device, and can reduce the high-order unwanted light emitted from the optical function device. Moreover, since the semi-transparent layer and the reflection prevention layer are not formed on the surface of the same side of the base material layer, this can reduce warping of the optical function device due to film stress. More specifically, flatness is enhanced as compared with an optical function device in which optical function layers such as a semi-transparent layer and a reflection prevention layer are stacked on one surface. As a result, in particular, the accuracy of the reflection angle of the reflection light is increased, and the AF performance is enhanced.

FIG. 1 is a schematic cross sectional view illustrating the optical function device according to the first embodiment. An optical function device 1 is configured to include a base material layer 3, a semi-transparent layer 5, and a reflection prevention layer 7, which are stacked. As illustrated in FIG. 1, the semi-transparent layer 5 is formed on a principal plane of the base material layer 3. The reflection prevention layer 7 is formed on a principal plane opposite to the surface formed with the semi-transparent layer 5 with respect to the base material layer 3. Hereinafter, the base material layer 3, the semi-transparent layer 5, and the reflection prevention layer 7 will be explained in order.

(Base Material Layer)

The base material layer 3 serves as a support substrate for forming the semi-transparent layer 5 and the reflection prevention layer 7. The shape and the size of the base material layer 3 is not particularly limited, but when the optical function device 1 is incorporated into the semi-transparent mirror-fixed-type image-capturing device, the thickness of the base material layer 3 is preferably thinner. More specifically, the thickness of the base material layer 3 is preferably equal to or more than 10 μm and equal to or less than 100 μm. This is because the distance for which the incident light transmits within the base material layer 3 can be reduced, and the degradation of the image-focus performance can be reduced. In addition, this is because the weight of the image-capturing device can be reduced.

The base material layer 3 is transparent. The base material layer 3 is preferably highly transparent in a visible light region. This is because, when the optical function device 1 is incorporated into a semi-transparent mirror-fixed-type image-capturing device, the sensitivity characteristics are determined by the design based on the visible light region. In this case, visible light region (this may be called a sensitivity region of an image-capturing device including a color filter) means a wavelength band of 400 nm to 700 nm. The optical transparency of the base material layer 3 itself is preferably such that, for example, the haze is 0.9 or less, but is also acceptable if predetermined transmittance and reflectance are achieved by the optical function device 1 formed with the semi-transparent layer 5 and the reflection prevention layer 7. The measurement condition of the haze is based on JIS K 7361 (ISO 13468), JIS K 7136 (ISO 14782), JIS K 7105 or ASTM D 1003. Hereinafter, a haze measurement device will be shown.

Measurement device: haze meter (NDH 5000 made by Nippon Denshoku Industries Co., Ltd.)

The base material layer 3 is preferably optically isotropic concerning the direction within the surface thereof. This is because, as compared with the case where the base material layer 3 is optically anisotropic concerning the direction within the surface thereof, the amount of light loss due to absorption when the light is incident can be reduced. When the optical function device is incorporated into the optical path of the image-capturing device, the variation of the transmittance for each wavelength can be reduced, and therefore, disruption of white balance can be reduced. In addition, this can suppress displacement of the image focus position in the oscillation direction of the light, and can suppress degradation of the image quality (resolution).

In this case, "optically isotropic" means that, when the refractive indexes in two directions perpendicular to each other within the surface are denoted as Nx, Ny, the value of $\Delta N = Nx - Ny$ (where $Nx > Ny$ holds) is less than 0.01. $\Delta N$ can be obtained by emitting a single wavelength light ray onto a sample, measuring a phase difference of transmission light, and using the following relationship: (phase difference)= (thickness of sample)$\times \Delta N$. In this specification, "optically isotropic" includes not only isotropy strictly in terms of optics but also a certain level of anisotropy caused by manufacturing error and measurement error (evaluation error). Hereinafter, a phase difference measurement device will be shown.

Measurement device: phase difference measurement device (KOBRA made by Oji Scientific Instruments)

A material of which $\Delta N$ is equal to or more than 0.01 may be used as a material constituting the base material layer 3. In this case, a measurement value of phase difference is preferably equal to or less than 300 nm. When the phase difference is equal to or less than 300 nm, the degradation of the image quality (resolution) is not affected even when the optical function device is incorporated into an optical path of the image-capturing device.

Examples of materials of the base material layer 3 include polycarbonate (PC), cycloolefin Polymer (COP), polyethyleneterephtalate (PET), polyethersulphone (PES), polyethylenenaphthalate (PEN), triacetylcellulose (TAC), polyimide, aramid (aromatic polyamide). The material of the base material layer 3 is not limited to resin. Alternatively, glass and the like may be used. In terms of being optically isotropic, PC which is amorphous plastic, polyimide, or COP is preferably selected. Alternatively, glass is preferably selected.

For example, acrylic resin-attached film may be used as the base material layer 3. A material which is transparent within the visible light region and having a desired optical transparency is to be selected.

(Semi-Transparent Layer)

The semi-transparent layer 5 is formed on a principal plane of the base material layer 3. The semi-transparent layer 5 is provided so that the optical function device 1 has predetermined reflectance and transmittance. For example, the semi-transparent layer is designed so that the optical function device 1 has reflection characteristics (light transmission characteristics) that have the reflectance of 30±10% (transmittance of 70±10%) in the visible light region.

For example, the semi-transparent layer 5 is a stacked body including a high refractive index material and a low refractive index material. A layer made of a high refractive index material (hereinafter referred to as a high refractive index layer) and a layer made of a low refractive index material (hereinafter referred to as a low refractive index layer) stacked alternately can be treated as the semi-transparent layer 3. The high refractive index material constituting the high refractive index layer is a material of which refractive index is equal to or more than 2.0 (for example, 2.0 to 2.5). The low refractive index material constituting the low refractive index layer is a material of which refractive index is less than 1.6.

A metal oxide can be used as the high refractive index layer. For example, the high refractive index material is preferably one of $In_2O_3$, $SnO_2$, $ZnO$, ITO, or an alloy thereof, or a transparent conductive material having ZnO doped with Al or Ga. Alternatively, it is preferably made of any one of $TiO_2$, $Nb_2O_5$, $ZrO_2$, $Ta_2O_5$. For example, the low refractive index material is preferably $MgF_2$, $AlF_3$, $SiO_2$.

FIG. 2A is a schematic cross sectional view illustrating an example of a configuration of the semi-transparent layer. In the example of the configuration illustrated in FIG. 2A, a high refractive index layer $5_H$ and a low refractive index layer $5_L$, are stacked on a principal plane of the base material layer 3. Hereinafter, an example of a layer configuration of the semi-transparent layer 5 and the base material layer 3 will be shown.

Layer configuration: (low refractive index layer/high refractive index layer) base material layer Low refractive index layer: $SiO_2$ ($TH_L$: about 20 nm)

High refractive index layer: $TiO_2$ or $Nb_2O_5$ ($TH_H$: about 60 nm)

Base material layer: polyimide, COP or PC ($TH_S$: 10 μm to 90 μm)

FIG. 2B is a figure illustrating a simulation result of optical characteristics expected from the layer configuration as illustrated in FIG. 2A. FIG. 2B illustrates reflectance R [%] and transmittance T [%] with respect to wavelength λ [nm] of the incident light.

As illustrated in FIG. 2B, according to the above configuration, the reflection characteristics of which reflectance is 30±10% in the visible light region are obtained. Hereinafter, the simulation condition of the reflectance and transmittance will be shown.

Simulation condition: an angle formed by a line normal to the sample and the optical axis of the incident light is considered as 37 degrees, and each of the reflectance and transmittance at each wavelength was calculated. The reflectance is obtained by the ratio of the reflection light that is output in the specular direction of the sample.

SWPF (Short Wave Pass Filter) design method can be used, so that the semi-transparent layer 5 has the predetermined reflectance and transmittance. The SWPF is a filter that transmits light at a short wavelength side and blocks (reflects) light at a long wavelength side. The basic design of the SWPF can be expressed by the following expression using a layer thickness H satisfying the relationship of: (refractive index of high refractive index material)×H=λ/4 (λ: design central wavelength) and a layer thickness L satisfying the relationship of: (refractive index of low refractive index material)×L=λ/4.

$$L/2 \cdot H \cdot L \ldots \cdot L \cdot H \cdot L/2 = L/2(HL)^n HL/2 \text{(a portion of "} \ldots \text{" represents a repetition, and n is an integer representing the number of repetitions.)}$$

For example, a film of PC (refractive index 1.59) is used as the base material layer 3, the first layer (L/2) of the above expression may be deemed as a PC film. Therefore, the above expression is simplified as shown in the expression (1) below.

$(HL)^n HL/2$ (n is an integer representing the number of repetitions)     expression (1)

Figure 2:
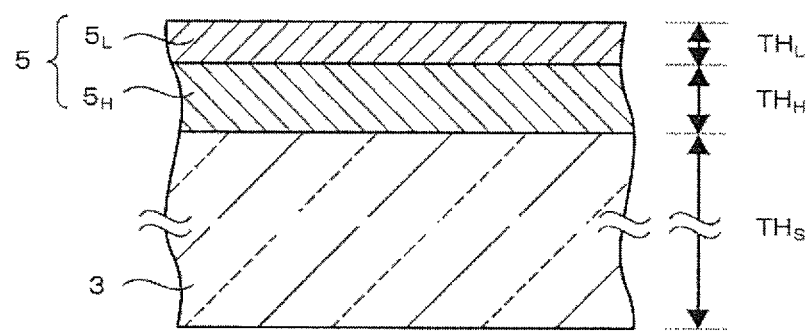
FIG. 2A is a schematic cross sectional view illustrating an example of configuration of a semi-transparent layer.
FIG. 2B is a figure illustrating a simulation result of optical characteristics expected from the layer configuration as illustrated in FIG. 2A.
Figure 2:
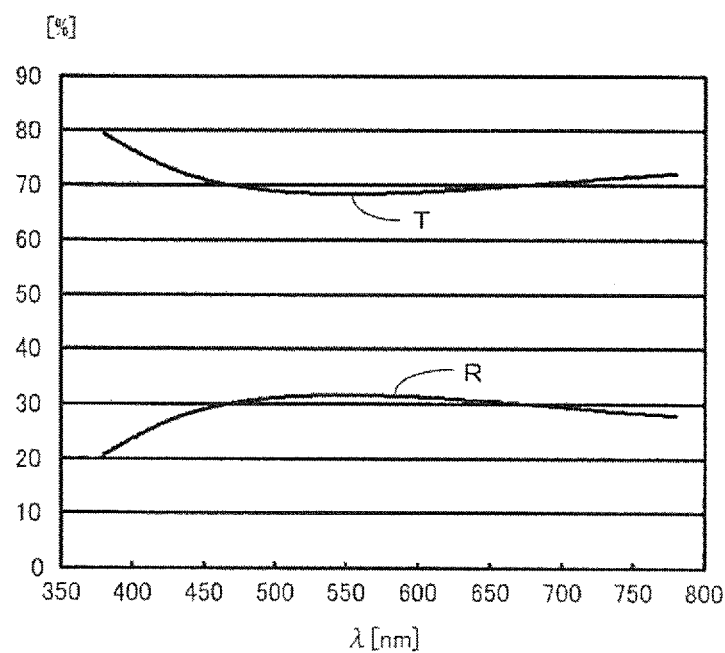

The design central wavelength is set, and the layer thickness H and the layer thickness L are designed fundamentally. Further, through optimization, target reflection characteristics (light transmission characteristics) are obtained. The layer configuration of the semi-transparent layer 5 is not limited to what is illustrated in FIG. 2. The layers may be configured to be stacked in order on the base material layer, with the low refractive index layer stacked first, and as necessary, multiple high refractive index layers and low refractive index layers may be further be stacked.

Dry process such as evaporation method, sputtering method, Chemical Vapor Deposition (CVD) can be applied as the method for forming the semi-transparent layer 5 on a principal plane of the base material layer 3.

(Reflection Prevention Layer)

The reflection prevention layer 7 is formed on a principal plane opposite to the surface formed with the semi-transparent layer 5 with respect to the base material layer 3. The reflection prevention layer 7 is provided to prevent the light that enters into the optical function device 1 from the surface formed with the semi-transparent layer 5 and advances through the inside of the optical function device 1 from being reflected at the output surface side of the optical function device 1 and returning back to the inside of the optical function device 1.

When the reflection prevention layer 7 is formed on the base material layer 3, the effective reflectance at the interface between the base material layer 3 and the reflection prevention layer 7 for the light incident from the side of the base material layer 3 is preferably set as low as possible. In particular, the effective reflectance close to a wavelength 555 nm where a relative luminosity is high is preferably set at a low value. More specifically, in the wavelength band of 400 nm to 650 nm, the average effective reflectance is preferably equal to or less than 1.20, and more preferably, equal to or less than 0.5%. This is because, when the optical function device is incorporated into the image-capturing device, and the average effective reflectance in the wavelength band of 400 nm to 650 nm is equal to or less than 1.2%, the occurrence of the ghost is suppressed. Also, when the average effective reflectance in the wavelength band of 400 nm to 650 nm is equal to or less than 0.5%, the ghost is suppressed to a level that is almost unnoticeable even when the recorded image is enlarged.

In this case, the effective reflectance is what can be obtained from the following relationship where the reflectance obtained only by measuring the base material layer that is not formed with the optical function layer such as the semi-transparent layer and the reflection prevention layer is denoted as Ro.

(effective reflectance)=(measurement value of reflectance of sample)−$Ro/2$

The reason why Ro is divided by 2 is to obtain the amount of contribution of one of the surfaces, among the contribution of the interface made between the incident side and the output side of the light.

For example, the reflection prevention layer 7 is a stacked body including materials of which refractive indexes are different, and may be a layer obtained by stacking inorganic material by evaporation method or sputtering method, or a layer obtained by applying organic material by wet coating. Alternatively, a layer called moth-eye having fine and dense pits and projections formed on the surface may be used as the reflection prevention layer 7.

Figure 3:
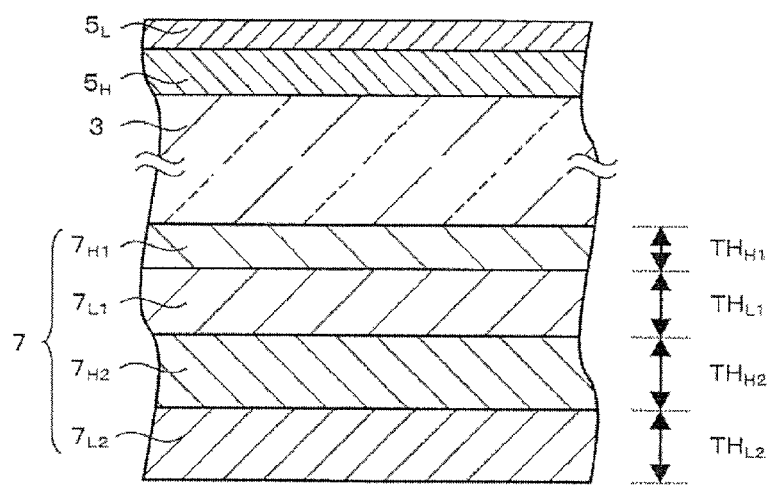
FIG. 3A is a schematic cross sectional view illustrating an example of configuration of a reflection prevention layer formed by stacking an inorganic material.
FIG. 3B is a figure illustrating a simulation result of optical characteristics expected from the layer configuration as illustrated in FIG. 3A.
Figure 3:
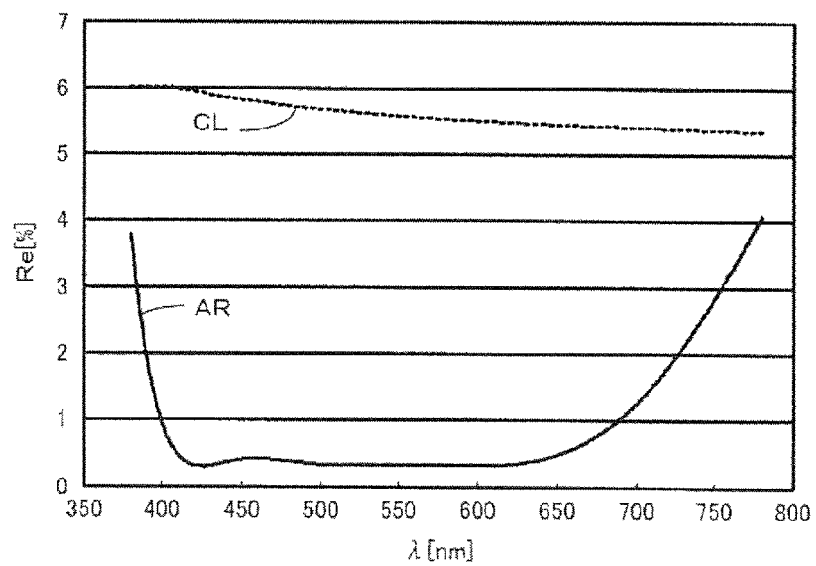

FIG. 3A is a schematic cross sectional view illustrating an example of configuration of a reflection prevention layer formed by stacking an inorganic material. In the example of configuration as illustrated in FIG. 3A, the semi-transparent layer 5 is formed on one principal plane of the base material layer 3. Further, the reflection prevention layer 7 is formed on a principal plane opposite to the surface formed with the semi-transparent layer 5. The reflection prevention layer 7 is configured to include a high refractive index layer $7_{H1}$, a low refractive index layer $7_{L1}$, a high refractive index layer $7_{H2}$, and a low refractive index layer $7_{L2}$, which are stacked in order. Alternatively, the layers may be stacked in order with the low refractive index layer stacked first, but $7_{H1}$ and $7_{H2}$, $7_{L1}$ and $7_{L2}$ need not be made of the same type of material. A material constituting the high refractive index layer and a material constituting the low refractive index layer may be selected from the same ones that are applied to the semi-transparent layer 5.

The reflection prevention layer constituted by stacking layers of which refractive indexes are different is configured such that the reflection light from each interface interfere with each other, and the reflection light is reduced by the effect of interference of the light. Therefore, the design of the reflection prevention layer 7 is basically the same as the design of the semi-transparent layer 3, and the design method of the above SWPF can be applied.

Hereinafter, an example of layer configuration of the base material layer 3 and the reflection prevention layer 7 will be shown. The layer configuration explained below is obtained from the method of SWPF explained above.

Layer configuration: base material layer/(high refractive index layer 1/low refractive index layer 1/high refractive index layer 2/low refractive index layer 2)

Base material layer: polyimide, COP or PC ($TH_S$: 10 μm to 90 μm)

High refractive index layer 1: $TiO_2$ or $Nb_2O_5$ ($TH_{H1}$: about 15 nm)

Low refractive index layer 1: $SiO_2$ ($TH_{L1}$: about 30 nm)

High refractive index layer 2: $TiO_2$ or $Nb_2O_5$ ($TH_{H2}$: about 120 nm)

Low refractive index layer 2: $SiO_2$ ($TH_{L2}$: about 95 nm)

FIG. 3B is a figure illustrating a simulation result of optical characteristics expected from the layer configuration as illustrated in FIG. 3A. FIG. 3B illustrates, with a solid line AR, a calculation result of the effective reflectance Re of the optical device having the reflection prevention layer 7. Among the contribution to the effective reflectance of the optical device without the reflection prevention layer 7, i.e., to the reflectance of the interface between the incident side and the output side of the light, a broken line CL illustrates a calculation result of the contribution of only one surface. Hereinafter, the simulation condition of the effective reflectance will be shown.

Simulation condition: an angle formed by a line normal to the sample and the optical axis of the incident light is considered as 37 degrees, and each of the reflectance at each wavelength was calculated. The effective reflectance is obtained from the ratio of the reflection light that is output in the specular direction of the sample. In addition, the layer configuration of the base material layer 3 and the semi-transparent layer 5 is the same as what is illustrated in FIG. 2A.

By taking an average in a wavelength band of 400 nm to 650 nm with the layer configuration as described above, an effective reflectance of almost 0.4% is obtained. As necessary, multiple high refractive index layers and low refractive index layers may be further be stacked.

As the reflection prevention layer 7, a layer applied with organic material may be used. For example, silicone resin including alkoxysilane silane and silane coupling material (SiO$_2$ fluorine polymers, refractive index: 1.3 to 1.4) and fluorine-based resin such as polytetrafluoroethylene (PTFE)) (refractive index: 1.3 to 1.4) can be used as the organic material.

Similar to forming the semi-transparent layer 5, methods for forming the reflection prevention layer 7 on a principal plane of the base material layer 3 can be selected, as necessary, from dry process such as evaporation method, sputtering method, and CVD or wet process such as spin coating, dip coating, roll coating, gravure coating, and die coating.

As described above, the effect of the reflection prevention by stacking layers of which refractive indexes are different is due to the effect of interference of the reflection light. More specifically, the effect of reflection prevention by forming a stacked body includes wavelength dependency and layer thickness dependency.

The moth-eye is formed with many dense pits and projections with a pitch less than the wavelength of the light to be transmitted, and the effect of the reflection prevention by the moth-eye is not greatly dependent on the wavelength. This is because the moth-eye acts like a layer of which effective refractive index continuously changes along the depth direction of the moth-eye structure with respect to the incident light. This is also because the effect of the reflection prevention by the moth-eye does not depend on the effect of interference. Therefore, by using the moth-eye, reflection characteristics where the average reflectance is 0.3% or less in the wavelength band of the visible light can be obtained.

Figure 4:
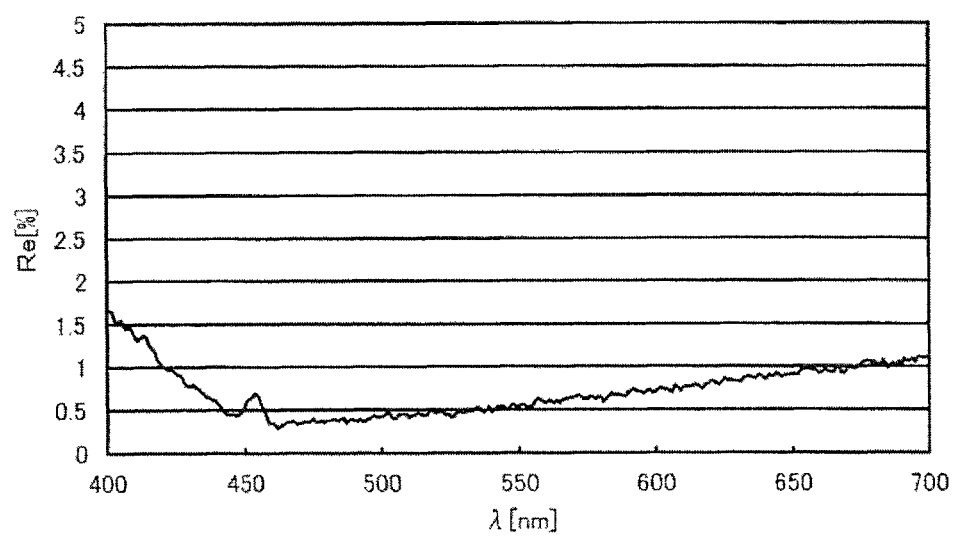
FIG. 4 is a figure illustrating an effective reflectance Re [%] with respect to a wavelength λ [nm] of incident light when moth-eye is formed on a base material as a reflection prevention layer.
Figure 5:
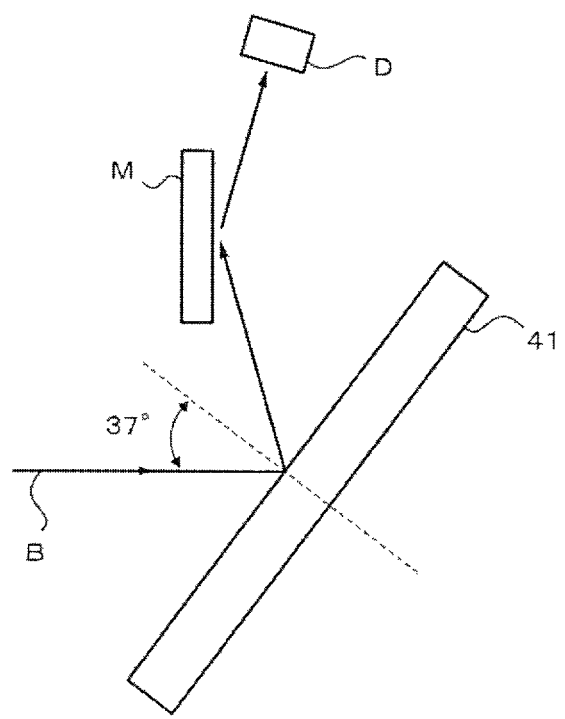
FIG. 5 is a schematic line diagram illustrating overview of spectroscopy of reflection light.

FIG. 4 is a figure illustrating an effective reflectance Re [%] with respect to a wavelength λ [nm] of incident light when moth-eye is formed on the base material layer 3 as the reflection prevention layer 7. In the example illustrated in FIG. 4, reflection characteristics where the average reflectance is about 0.7% can be obtained in the wavelength band of 400 nm to 650 nm. Hereinafter, a measurement device and a measuring method of the reflectance for calculating the effective reflectance will be shown. FIG. 5 illustrates an overview of spectroscopy of reflection light.

Measurement device: ultraviolet-visible spectrophotometer (UBest V560 made by JASCO Corporation)

Measuring method: an angle formed by a line normal to the sample and the optical axis of the incident light was set as 37 degrees, and the reflection light is detected with a detector, so that each of the reflectance at each wavelength was measured. As illustrated in FIG. 5, the reflection light from a sample 41 is detected such that a detector D detects the light reflected by a mirror M.

To manufacture the moth-eye, for example, a method for transferring the irregular shapes of the master (original) and a method for replicating the irregular shapes of the master (original) using nanoimprint are known. When making the master, etching and electron beam exposure and the like can be used. Examples of transfer methods applicable to replication of the irregular shapes of the master include a method for pouring energy ray-curable resin into a cast and emitting the energy ray to cure the resin, a method for transferring the shape by applying heat and pressure to the resin, or a method for providing a resin film from a roll and transferring the shape of the cast by applying heat (laminate transfer method).

(Reduction of Warping)

In this case, in a preferred embodiment, first, one of the semi-transparent layer 5 and the reflection prevention layer 7 is formed on the base material layer 3, and thereafter, the other of the semi-transparent layer 5 and the reflection prevention layer 7 is formed on the base material layer 3. In other words, the semi-transparent layer 5 and the reflection prevention layer 7 are not formed in an overlapping manner on the principal plane of the same side of the base material layer 3. If, for example, the reflection prevention layer is formed on the semi-transparent layer in an overlapping manner, substantially all the incident light enters into the optical function device, and on the surface that is not formed with the reflection prevention layer and the semi-transparent layer, reflection to the inside of the optical function device occurs. More specifically, neither the reflection prevention layer nor the semi-transparent layer achieves the intended function.

The semi-transparent layer 5 and the reflection prevention layer 7 are formed on the principal planes opposite to each other, and there is a secondary advantage in that this reduces the warping of the optical function device 1. It should be noted that the "warping" in this case includes not only one-dimensional bending but also two-dimensional distortion.

When the semi-transparent layer and the reflection prevention layer are formed on the surfaces opposite to each other with respect to the base material layer, the effect of improving the warping of the optical function device is found in the following procedure.

A sample SS-1 and a sample SS-2 were prepared, in which only semi-transparent layer was formed on one surface of the base material layer. A sample BS-1 and a sample BS-2 were prepared, in which the semi-transparent layer was formed on one surface of the base material layer, and the reflection prevention layer was formed on the opposite surface. The semi-transparent layer and the reflection prevention layer of each sample were formed by stacking inorganic materials of which refractive indexes are different. The base material layer uses a PC of which thickness is about 90 μm.

When the size of warping of each sample was measured using a compact laser interferometer made by FUJIFILM Corporation (F601 (flat surface measurement)), the following result was obtained.

Sample SS-1: 0.708 μm, sample SS-2: 0.691 μm
Sample BS-1: 0.606 μm, sample BS-2: 0.669 μm In this case, the size of warping of each sample is a difference between the highest point and the lowest point in the measurement region (36 mm☐).

As compared with a case where only the semi-transparent layer is formed on one surface of the base material layer, the size of warping can be reduced when the semi-transparent layer and the reflection prevention layer are formed on the surfaces opposite to each other with respect to the base material layer. This is considered to be because a film stress by a semi-transparent layer and a film stress by a reflection prevention layer are cancelled, and the size of the warping is reduced.

When the optical function device is incorporated into an image-capturing device and the like, the warping of the optical function device is preferably suppressed. In particular, when the optical function device is used as a semi-transparent mirror of a semi-transparent mirror-fixed-type image-capturing device, warping is preferably suppressed. When the semi-transparent mirror is greatly warped, the reflection light which is meant to come into the AF module propagates in a direction different from the design, and there is adverse effect on the AF.

Figure 6:
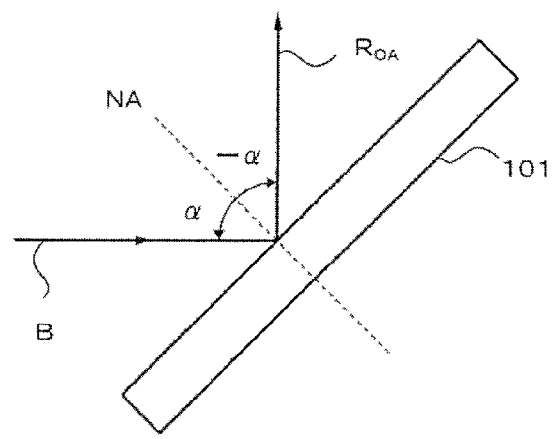
FIGS. 6A and 6B are schematic line diagrams illustrating a semi-transparent mirror-fixed-type image-capturing device, and explain how the AF is affected by warping of the semi-transparent mirror.
Figure 6:
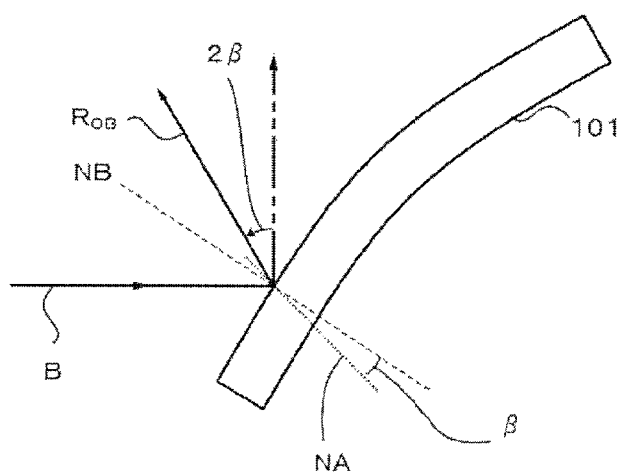

FIGS. 6A and 6B are schematic line diagrams illustrated to explain how the AF is affected by warping of the semi-transparent mirror in a semi-transparent mirror-fixed-type image-capturing device. FIGS. 6A and 6B schematically illustrates a cross sectional surface including the image-capturing-based optical axis in a semi-transparent mirror-fixed-type image-capturing device.

When the semi-transparent mirror 101 is in a flat plate shape as illustrated in FIG. 6A, a subject light B is assumed to enter at an angle of α with respect to the normal line NA on the semi-transparent mirror 101. At this occasion, the direction in which the reflection light $R_{OA}$ propagates forms an angle of −α with respect to the normal line NA.

When the semi-transparent mirror 101 is greatly warped and the cross section is an arc shape as illustrated in FIG. 6B, the normal line NB to the tangent plane upon which the subject light B enters is assumed to form an angle of β with respect to the normal line NA. At this occasion, the reflection light $R_{OB}$ propagates in a direction displaced by an angle of 2β with respect to $R_{OA}$. FIG. 6B illustrates a case where the semi-transparent mirror 101 protrudes with respect to the light incident side, but the case where it protrudes with respect to the light output side is the same.

As described above, in the configuration in which the reflection light $R_O$ is used for the AF, the performance of the AF is greatly affected by the warping of the semi-transparent mirror. Therefore, the reduction of warping of the optical function device contributes to the improvement of the AF performance of the semi-transparent mirror-fixed-type image-capturing device.

<2. Second Embodiment>

Subsequently, the second embodiment will be explained. The second embodiment relates to a semi-transparent mirror-fixed-type image-capturing device in which an optical function device of which internal multiple reflection is suppressed is provided as a semi-transparent mirror.

[Image-Capturing Device]

The image-capturing device includes an optical function device, a first light receiving device for receiving transmission light from the optical function device, and a second light receiving device for receiving reflection light from the optical function device, wherein the optical function device fixes the light incident side with respect to the first light receiving device.

The optical function device includes a base material layer, a semi-transparent layer formed on a principal plane of the base material layer, and a reflection prevention layer formed on a principal plane opposite to the surface formed with the semi-transparent layer. The semi-transparent layer reflects incident light with a ratio defined in advance, and transmits the remaining light. The reflection prevention layer prevents the light advancing in the base material layer from being reflected by an interface between the base material layer and the reflection prevention layer and from being returned back to the inside of the base material layer. In the optical function device, internal multiple reflection is suppressed.

Therefore, this suppresses emission of high-order unwanted light from the optical function device, and this suppresses the appearance of a ghost. This also suppresses mixing of the noise light in the reflection light from the optical function device, and the AF can be performed reliably.

(Configuration of Image-Capturing Device)

Figure 7:
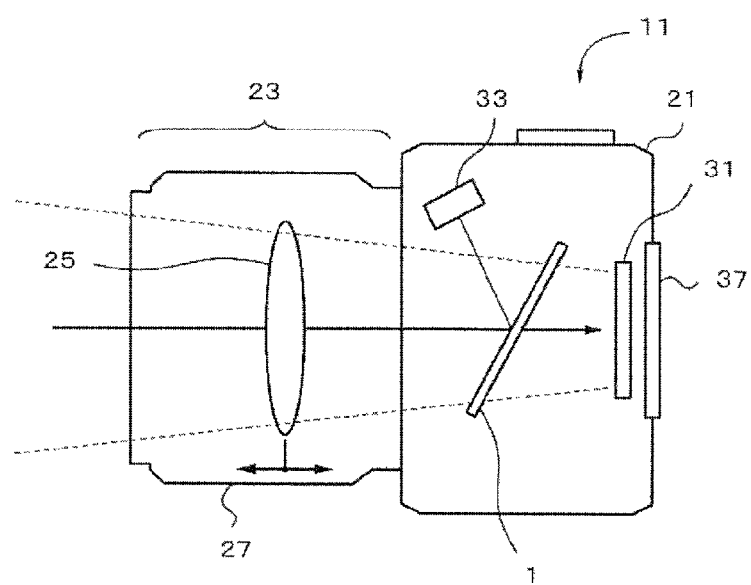
FIG. 7A is a schematic cross sectional view illustrating overview of an image-capturing device according to a second embodiment.
FIG. 7B is a schematic line diagram enlarging and illustrating a portion close to the optical function device.
Figure 7:
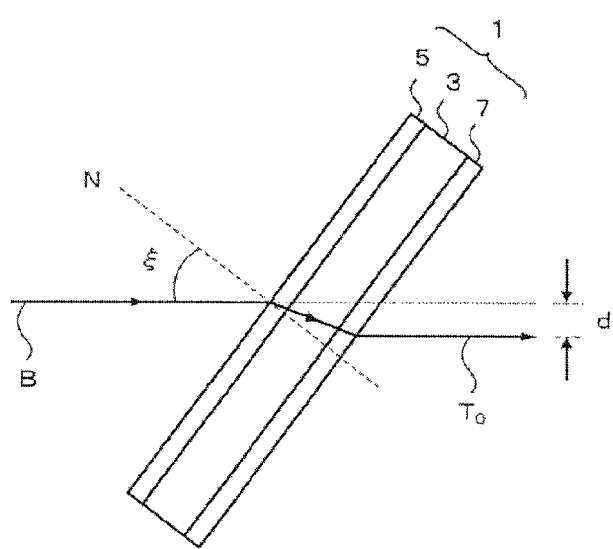

FIG. 7A is a schematic cross sectional view illustrating overview of an image-capturing device according to the second embodiment. FIG. 7B is a schematic line diagram enlarging and illustrating a portion close to the optical function device. The schematic configuration of the image-capturing device as illustrated in FIG. 7A is like what is illustrated in FIG. 10A, but an image-capturing device 11 according to the second embodiment has a first light receiving device 31 instead of the film. For example, the first light receiving device 31 is an image-capturing device such as a CCD and a CMOS, and functions as an image sensor.

As illustrated in FIG. 7A, a replaceable image-capturing optical system 23 is attached to a housing 21 constituting a main body of the image-capturing device 11. An image-capturing lens 25, a diaphragm, and the like are arranged in a lens barrel 27, which constitute the image-capturing optical system 23. The image-capturing lens 25 of the image-capturing optical system 23 is driven by a focus driving system (not shown), which enables AF operation. It should be noted that the image-capturing optical system may be integrally formed with a housing.

Inside of the housing 21, an optical function device 1 is fixed as a semi-transparent mirror. Above the optical function device 1, a second light receiving device 33 is provided. The second light receiving device is, for example, an image-capturing device. The image-capturing device has, for example, the function of the AF sensor. When the AF sensor is arranged as the second light receiving device, it is preferably an AF sensor of phase difference detection method, but may have a function of an AF sensor of contrast AF method. The phase difference detection method and the contrast AF method may be combined as the AF method. In order to perform high performance AF even in a dark place or for a subject of a low contrast, AF assist light may be generated, and the AF evaluation value may be formed from the returned light.

At the side opposite to the image-capturing lens 25 with respect to the optical function device 1, the first light receiving device 31 is provided. In FIG. 7A, a shutter mechanism is not shown, but either of a mechanical shutter or an electronic shutter can be applied.

The image-capturing device 11 is provided with a display 37 having a function of electronic view finder. The display 37 is a flat display such as a liquid crystal display (LCD) and an organic EL (Electroluminescence: Electroluminescence effect). The display 37 receives a video signal obtained by causing a signal processing unit (not shown) to process an image-capturing signal retrieved from the second light receiving device 33 serving as the image-capturing device or the first light receiving device 31, and displays a current subject image (motion picture). In the example as illustrated in FIG. 7A, the display 37 is provided at the back side of the housing 21, but this is not limited thereto. Alternatively, it may be provided on the upper surface of the housing, and may be a movable-type or a detachable-type.

(Arrangement of Optical Function Device)

In this case, the angle at which the optical function device 1 is fixed will be explained with reference to FIG. 7B. In a preferable embodiment, the optical function device 1 is fixed such that an angle ξ formed by the normal line N to the principal plane of the optical function device 1 and the optical axis of the subject light B is as follows: ξ<45 degrees. This is because, by doing so, the distance for which the subject light passes the optical function device 1 (which may be referred to as an optical distance) can be reduced, and the degradation of the image quality can be reduced. In addition, this is because it is possible to reduce a shift d of the light bundle, which is caused when the subject light is refracted at the interface of the optical function device 1. Further, this is because, the smaller the angle ξ is, the smaller the reflectance of the reflection prevention layer is, and the effect of the reflection prevention by the reflection prevention layer is increased (low reflection).

In FIG. 7B, the optical function device 1 is fixed such that the reflection prevention layer 7 is at a side closer to the first light receiving device 31. On the contrary, the reflection prevention layer 7 may be at a side closer to the image-capturing lens 25, but the optical function device 1 is preferably fixed such that the reflection prevention layer 7 is at a side closer to the first light receiving device 31. This is because when the AF module having the AF sensor as the second light receiving device is arranged above the optical function device 1, the light that does not pass through the inside of the optical function device 1 can be used for the AF.

According to the second embodiment, the optical function device 1 is provided as the semi-transparent mirror, and therefore, the emission of high-order unwanted light to the image-capturing device 31 is suppressed. Therefore, the digital image obtained by the image-capturing device 11 is made with the appearance of ghost suppressed. When the AF module having the AF sensor as the second light receiving device is arranged, mixing of the noise light into the AF module is reduced, and therefore, the AF can be performed reliably. Further, as compared with the semi-transparent mirror made by depositing the optical thin film on one surface, warping of the optical function device 1 is reduced. Therefore, the reflection light from the optical function device 1 can be reliably guided to the second light receiving device 33.

EXAMPLE

Five types of sample S1 to sample S5 were prepared as optical function devices, and for each sample, reflectance with respect to wavelength λ [nm] of incident light was measured, and each effective reflectance Re [%] was obtained from the measurement result. Subsequently, the sample S1 to the sample S5 were respectively incorporated into the image-capturing devices, and images were taken in a dark room using a light source device as a subject.
(Sample S1 to Sample S3)

A PC of which thickness is about 90 µm was used as a base material layer, and four layers which were arranged $Nb_2O_5/SiO_2/Nb_2O_5/SiO_2$ from the side close to the base layer material were stacked as the reflection prevention layer by a sputtering method. The thickness of each layer in each sample was different from each other. On a surface opposite to the surface formed with the reflection prevention layer, a semi-transparent layer was formed, which was constituted by $Nb_2O_5/SiO_2$ arranged from the side closer to the base material layer.
(Sample S4)

The sample S4 was prepared in the same manner as the sample S1 except that two layers including $Nb_2O_5/SiO_2$ arranged from the side closer to the base material layer, were stacked as the reflection prevention layer.
(Sample S5)

A sample having only a base material layer having neither the reflection prevention layer nor the semi-transparent layer formed thereon was prepared as the sample S5.

Figure 8:
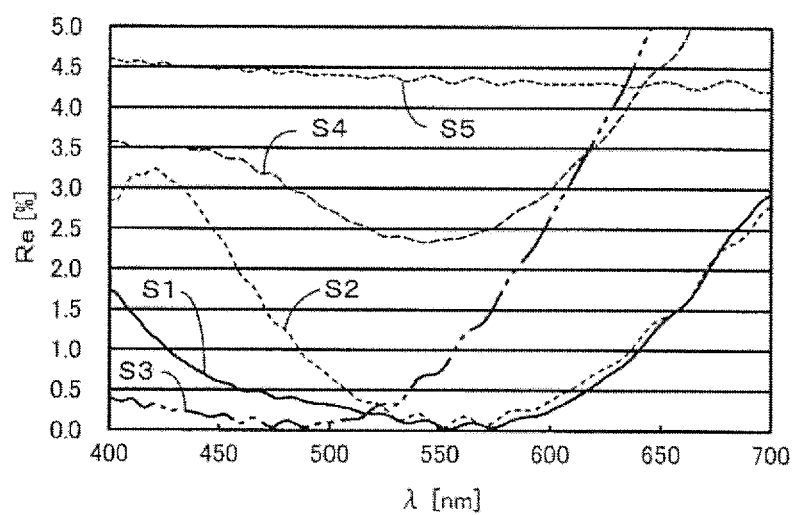
FIG. 8 is a figure illustrating an effective reflectance Re [%] with respect to a wavelength λ [nm] of incident light, concerning sample S1 to sample S5.
Figure 9:
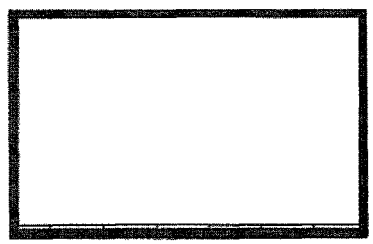
FIGS. 9A to 9E are figures for explaining images captured by a light source device, concerning sample S1 to sample S5.
Figure 9:
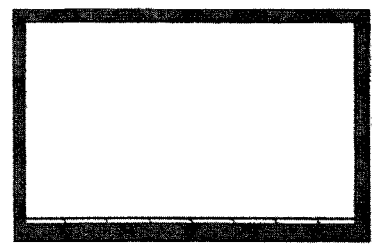
Figure 9:
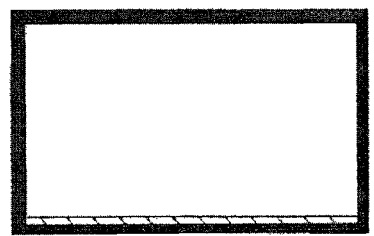
Figure 9:
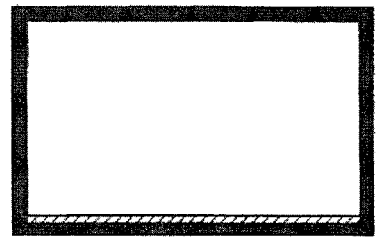
Figure 9:
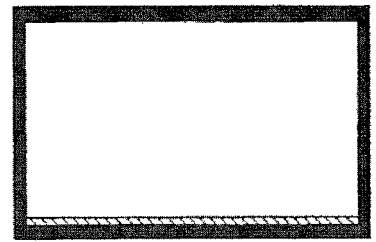

FIG. 8 is a figure illustrating an effective reflectance Re [%] with respect to a wavelength λ [nm] of incident light, concerning sample S1 to sample S5. Hereinafter, a measurement device and a measuring method of the reflectance for calculating the effective reflectance will be shown.

Measurement device: ultraviolet-visible spectrophotometer (UBest V560 made by JASCO Corporation)

Measuring method: an angle formed by a line normal to the sample and the optical axis of the incident light was set as 37 degrees, and the reflection light was detected with a detector, and each of the reflectance at each wavelength was measured. As illustrated in FIG. 5, the reflection light from a sample 41 is detected such that a detector D detects the light reflected by a mirror M.

FIGS. 9A to 9E are figures for explaining images captured by a light source device, concerning sample S1 to sample S5.

FIGS. 9A, 9B, 9C, 9D and 9E are figures respectively corresponding to the samples S1, S2, S3, S4 and S5. In FIG. 9, a shaded portion is a region corresponding to ghost. In the sample S1, no ghost was confirmed even when the captured image is enlarged. In the sample S2, ghost was hardly confirmed. In the sample S3, the ghost is clearly confirmed, and the ghost seemed to be reddish. In the sample S4 and the sample S5, the ghost is clearly confirmed. For each sample, an average effective reflectance in a wavelength band of 400 nm to 650 nm is shown as follows.

sample S1 . . . 0.49 [%]
sample S2 . . . 1.13 [%]
sample S3 . . . 1.24 [%]
sample S4 . . . 3.08 [%]
sample S5 . . . 4.39 [%]

Hereinafter, the details of the subject and the image-capturing conditions are shown.

Subject: evaluation/adjustment light source device (DNP Standard Color Viewer Lamps HDF-51F made by Dai Nippon Printing Co., Ltd.)

Image-capturing condition: ISO 200, F 5.6, exposure time 1/60 seconds, DRO auto setting, focal length of image-capturing lens is 18 mm, distance from subject is about 1 m From FIG. 8 and FIG. 9, it is understood that appearance of ghost is suppressed by reducing the reflectance caused by the reflection at the interface at the light output side of the optical function device. The color of the appearing ghost is the same as the result expected from the measurement result of the reflectance, and this fact also indicates that occurrence of ghost is suppressed by suppressing occurrence of multiple reflections within the optical function device.

As described above, according to the preferred embodiment, multiple reflections within the optical function device can be suppressed, and therefore, the image-capturing device can be configured such that appearance of ghost is suppressed.

<3. Modification>

Heretofore, a preferred embodiment has been explained, but a preferred example is not limited to the above explanation, and various kinds of modifications can be made.

For example, the optical function device 1 can also be applied not only to the image-capturing device but also to reflection mirrors and the like of an exposure device and a microscope. As necessary, a hard coating, an antifouling coating, a self-cleaning layer, an IR cut filter, a UV cut filter, and the like may be further stacked in the configuration.

In the above explanation, for example, a digital camera is used as an example of the image-capturing device 11, but the above configuration may be applied to a digital camera capable of capturing motion picture.

For example, the disclosure of the present application may be configured as follows.
(1)
An optical function device including:
a base material layer;
a semi-transparent layer formed on a principal plane of the base material layer, the semi-transparent layer reflecting light of incident light at a ratio determined in advance and passing remaining light; and
a reflection prevention layer formed on a principal plane opposite to the principal plane of the base material layer with respect to the base material layer, the reflection prevention layer preventing reflection of the light passing through the base material layer.
(2)
The optical function device according to (1), wherein the base material layer is made of an optically isotropic material.

(3)

The optical function device according to (1) or (2), wherein a thickness of the base material layer is equal to or less than 100 μm.

(4)

The optical function device according to any one of (1) to (3), wherein an average of an effective reflectance of the reflection prevention layer in a wavelength band of 400 nm to 650 nm is equal to or less than 1.2%.

(5)

The optical function device according to any one of (1) to (4), wherein the semi-transparent layer and the reflection prevention layer are made of a same material.

(6)

The optical function device according to any one of (1) to (5), wherein the semi-transparent layer and the reflection prevention layer are formed by sputtering method.

(7)

The optical function device according to any one of (1) to (5), wherein the semi-transparent layer and the reflection prevention layer are formed by evaporation method.

(8)

The optical function device according to any one of (1) to (4), wherein the reflection prevention layer is a moth-eye layer.

(9)

An image-capturing device includes an optical function device including:

a base material layer;

a semi-transparent layer formed on a principal plane of the base material layer, the semi-transparent layer reflecting light of incident light at a ratio determined in advance and passing remaining light; and a reflection prevention layer formed on a principal plane opposite to the principal plane of the base material layer with respect to the base material layer, the reflection prevention layer preventing reflection of the light passing through the base material layer, the image-capturing device further includes a first light receiving device for receiving transmission light from the optical function device and a second light receiving device for receiving reflection light from the optical function device.

(10)

The image-capturing device according to (9), wherein the first light receiving device is a first image-capturing device, and the second light receiving device is a second image-capturing device.

(11)

The image-capturing device according to (10), wherein the second light receiving device is an autofocus sensor.

(12)

The image-capturing device according to (11), wherein the autofocus sensor is an autofocus sensor of phase difference detection method.

(13)

The image-capturing device according to any one of (9) to (12), wherein an angle formed by a normal line to a principal plane of the optical function device and an optical axis of subject light is less than 45 degrees.

(14)

The image-capturing device according to any one of (9) to (13), wherein the principal plane on which the reflection prevention layer is formed is a principal plane at a side close to the first light receiving device.

REFERENCE SIGNS LIST

1 Optical function device
3 Base material layer
5 Semi-transparent layer
$5_H$ High refractive index layer
$5_L$ Low refractive index layer
7 Reflection prevention layer
$7_{H1}$, $7_{H2}$ High refractive index layer
$7_{L1}$, $7_{L2}$ Low refractive index layer
11 Image-capturing device
21 Housing
23 Image-capturing optical system
25 Image-capturing lens
27 Lens barrel
31 First light receiving device
33 Second light receiving device
37 Display

The invention claimed is:

1. An optical function, device comprising:

a base material layer;

a semi-transparent layer, formed by a high refractive index material layer and a low refractive index material layer, configured to reflect incident light at a predetermined ratio and allow remaining light to pass; and a reflection prevention layer, formed by two alternating layers of a high refractive index layer and two alternating layers of low refractive index layers, configured to prevent reflection of the light passing through the base material layer; and wherein the base material layer is positioned between the semi-transparent layer and the reflection prevention layer.

2. The optical function device according to claim 1, wherein the base material layer is made of an optically isotropic material.

3. The optical function device according to claim 1, wherein a thickness of the base material layer is equal to or less than 100 μm.

4. The optical function device according to claim 1, wherein an average of an effective reflectance of the reflection prevention layer in a wavelength band of 400 nm to 650 nm is equal to or less than 1.2%.

5. The optical function device according to claim 1, wherein the semi-transparent layer and the reflection prevention layer are made of a same material.

6. The optical function device according to claim 1, wherein the semi-transparent layer and the reflection prevention layer are formed by sputtering method.

7. The optical function device according to claim 1, wherein the semi-transparent layer and the reflection prevention layer are formed by evaporation method.

8. The optical function device according to claim 1, wherein the reflection prevention layer is a moth-eye layer.

9. An image-capturing device, comprising:

an optical function device including a base material layer, a semi-transparent layer formed by a high refractive index material layer and a low refractive index material layer, configured to reflect incident light at a predetermined ratio and allow remaining light to pass, and a reflection prevention layer formed by two alternating layers of a high refractive index layer and two alternating layers of low refractive index layers, configured to prevent reflection of the light passing through the base material layer;

a first light receiving device for receiving transmission light from the optical function device; and a second light receiving device for receiving reflection light from the optical function device; and wherein the base material layer is positioned between the semi-transparent layer and the reflection prevention layer.

10. The image-capturing device according to claim 9, wherein the first light receiving device is a first image-capturing device, and the second light receiving device is a second image-capturing device.

11. The image-capturing device according to claim 9, wherein the second light receiving device is an autofocus sensor.

12. The image-capturing device according to claim 11, wherein the autofocus sensor is an autofocus sensor of phase difference detection method.

13. The image-capturing device according to claim 9, wherein an angle formed by a normal line to a principal plane of the optical function device and an optical axis of subject light is less than 45 degrees.

14. The image-capturing device according to claim 9, wherein the principal plane on which the reflection prevention layer is formed is a principal plane at a side close to the first light receiving device.

* * * * *